(12) United States Patent
Browning, Jr.

(10) Patent No.: US 12,095,250 B1
(45) Date of Patent: Sep. 17, 2024

(54) ATTIC AND WALL WIRE GUIDE AND ASSOCIATED METHOD(S)

(71) Applicant: Guy E. Browning, Jr., Jacksonville, FL (US)

(72) Inventor: Guy E. Browning, Jr., Jacksonville, FL (US)

( * ) Notice: Subject to any disclaimer, the term of this patent is extended or adjusted under 35 U.S.C. 154(b) by 0 days.

(21) Appl. No.: 18/489,601

(22) Filed: Oct. 18, 2023

Related U.S. Application Data

(60) Provisional application No. 63/379,966, filed on Oct. 18, 2022.

(51) Int. Cl.
| H02G 3/22 | (2006.01) |
| H02G 1/08 | (2006.01) |
| H02G 3/00 | (2006.01) |
| H02G 3/04 | (2006.01) |

(52) U.S. Cl.
CPC .............. *H02G 3/263* (2013.01); *H02G 1/08* (2013.01); *H02G 3/0481* (2013.01)

(58) Field of Classification Search
CPC ........ H02G 3/263; H02G 1/08; H02G 3/0481; H02G 3/22; H02G 3/26; H02G 3/28; H02G 3/281; H02G 3/30; H02G 3/36; H02G 3/381; H02G 3/04; H02G 3/00
USPC ...... 174/480, 481, 491, 503, 50, 68.1, 72 A, 174/88 R, 70 C, 135; 220/3.2–3.9, 4.02; 248/49, 51, 58, 61, 63, 68.1, 74.1, 74.2; 385/134, 135
See application file for complete search history.

(56) References Cited

U.S. PATENT DOCUMENTS

| 5,090,645 | A | * | 2/1992 | Zuercher | F16L 3/223 248/68.1 |
| 6,056,245 | A | * | 5/2000 | White | H02G 3/30 248/74.1 |
| 6,648,280 | B1 | * | 11/2003 | Chong | A47B 21/06 248/65 |
| 6,800,806 | B1 | * | 10/2004 | Grday | H02G 3/126 248/906 |
| 7,514,630 | B2 | * | 4/2009 | Anderson | H02G 3/30 174/72 A |
| 7,607,618 | B2 | * | 10/2009 | Mori | H02G 3/32 248/68.1 |
| 7,837,156 | B1 | * | 11/2010 | Handler | F16L 3/1218 248/339 |
| 8,464,985 | B2 | * | 6/2013 | Mulch | H02G 3/30 248/68.1 |

(Continued)

*Primary Examiner* — Angel R Estrada
(74) *Attorney, Agent, or Firm* — Ashkan Najafi (57) ABSTRACT

An electrical line guide includes a single and unitary body having a cylindrical shape and including an open proximal end and an open distal end coaxially aligned therewith and opposed therefrom, an outer surface extended from the open proximal end to the open distal end, an axial bore linearly extended from the open proximal end to the open distal end, a first aperture located at an anterior side of the outer surface, and a second aperture located at a posterior side of the outer surface. A fastener is removably penetrated entirely through the first aperture and partially through the second aperture and terminating in an existing support surface. The axial bore is configured to receive a plurality of electrical lines therethrough while the single and unitary body is supported at an elevated height relative to the existing support surface.

20 Claims, 4 Drawing Sheets

(56) References Cited

U.S. PATENT DOCUMENTS

| | | | |
|---|---|---|---|
| 9,328,852 B2 * | 5/2016 | Satterwhite | H02G 3/22 |
| 11,685,322 B2 * | 6/2023 | Adams | H01R 43/28 |
| | | | 174/72 A |

* cited by examiner

ATTIC AND WALL WIRE GUIDE AND ASSOCIATED METHOD(S)

CROSS REFERENCE TO RELATED APPLICATIONS

This is a non-provisional patent application that claims priority to and benefit of U.S. provisional patent application No. 63/379,966 filed Oct. 18, 2022, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to conduits and, more particularly, to a specially configured electrical wire/cable guide that facilitates easy access to the electrical wire/cable during repairs while preventing damage to its dielectric insulation, which can degrade its electrical signal and cause fires.

Prior Art

In most cases electrical line and cabling are nailed, stapled or clamped into place. This can cause damage not only to the dielectric coaxial cable but also to the insulation of electrical line creating a shock or fire hazard. If electrical line replacement is necessary, it is difficult and time consuming to remove the nails, staples, and clamps.

Thus, most construction procedures staple or nail electrical wiring in walls or attic spaces, which degrades or makes it exceedingly difficult to replace existing wiring without tearing into walls. Various types of connectors have been proposed or used for securing electrical wiring to various support structures. For example, conventional wire holders utilize a flexible strap or band which fits through openings in a base member and about the object to be secured. The ends of the band are drawn together and are secured together by a clamp. A disadvantage of this type of prior art cable holders is that the strap must be tightly drawn about the object to be secured, and a clamp applied and/or the strap or a securement member must be bent as a part of the installation process and then straightened during removal. Many of such conventional holders are fixedly stapled or nailed in wood frame members, which makes is exceedingly difficult to remove and reroute or replace the electrical cable.

Accordingly, a need remains for a specially configured electrical wire/cable guide in order to overcome at least one of the above-noted shortcomings. The exemplary embodiment(s) satisfy such a need by a specially configured electrical wire/cable guide that is convenient and easy to use, lightweight yet durable in design, versatile in its applications, and configured to facilitate easy access to the electrical wire/cable during repairs while preventing damage to its dielectric insulation, which can degrade its electrical signal and cause fires.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide specially configured electrical wire/cable guide that facilitates easy access to the electrical wire/cable during repairs while preventing damage to its dielectric insulation, which can degrade its electrical signal and cause fires. These and other objects, features, and advantages of the non-limiting exemplary embodiment(s) are provided by an electrical line guide including a single and unitary body having a predetermined fixed (e.g., cylindrical) shape and including an open proximal end and an open distal end coaxially aligned therewith and opposed therefrom, an outer surface extended from the open proximal end to the open distal end, an axial bore linearly extended from the open proximal end to the open distal end, a first aperture located at an anterior side of the outer surface, and a second aperture located at a posterior side of the outer surface. A fastener is removably penetrated entirely through the first aperture and partially through the second aperture and terminating in an existing support surface. Advantageously, the axial bore is configured to receive a plurality of electrical lines therethrough while the single and unitary body is supported at an elevated height relative to the existing support surface (e.g., rafter, truss, stud wall, footing, etc.).

In a non-limiting exemplary embodiment, the open proximal end has a first diameter equal to a second diameter of the open distal end.

In a non-limiting exemplary embodiment, the open proximal end has a circular shape.

In a non-limiting exemplary embodiment, the open distal end has a circular shape.

In a non-limiting exemplary embodiment, the first aperture has a third diameter greater than a fourth diameter of the second aperture.

In a non-limiting exemplary embodiment, the first aperture is diametrically opposed from the second aperture.

In a non-limiting exemplary embodiment, the axial bore has a uniform fifth diameter configured to support the electrical line along an entire longitudinal length of the single and unitary body.

In a non-limiting exemplary embodiment, the fastener is oriented orthogonal to a longitudinal length of the single and unitary body.

In a non-limiting exemplary embodiment, the single and unitary body has a tubular shape.

In a non-limiting exemplary embodiment, the axial bore is continuous and uninterrupted along an entire longitudinal length of the body.

In a non-limiting exemplary embodiment, the single and unitary body has an entirely smooth inner surface, wherein the outer surface is entirely smooth.

In a non-limiting exemplary embodiment, the single and unitary body may include one or more divider walls and smaller conduits extended longitudinally therethrough for receiving, isolating, and segregating wires as needed.

The present disclosure further includes a method of using an electrical line guide to facilitate easy access to an electrical line located within a building attic or wall frame. The method includes the chronological steps of: obtaining an electrical line guide including a single and unitary body having a predetermined fixed cylindrical shape and including an open proximal end and an open distal end coaxially aligned therewith and opposed therefrom, an outer surface extended from the open proximal end to the open distal end, an axial bore linearly extended from the open proximal end to the open distal end, a first aperture located at an anterior side of the outer surface, and a second aperture located at a posterior side of the outer surface; obtaining a fastener; removably penetrating the fastener entirely through the first aperture; partially penetrating the fastener through the second aperture; terminating the fastener in an existing support surface such that the single and unitary body is supported at an elevated height relative to the existing support surface; obtaining a plurality of electrical lines; and passing the electrical lines through the axial bore while maintaining the electrical lines spaced from the existing support surface.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

Figure 1:
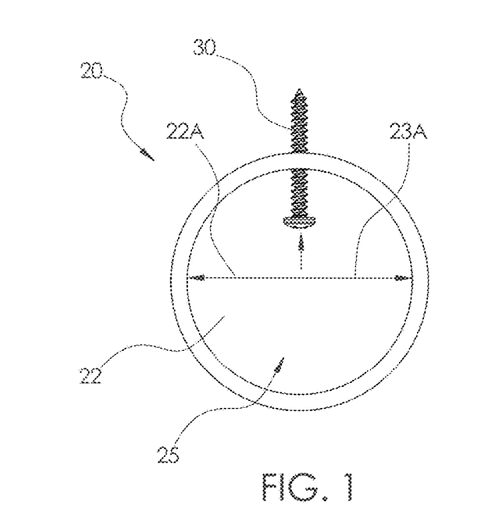
FIG. 1 is a front elevational view of an electrical wire/cable guide, in accordance with a non-limiting exemplary embodiment of the present disclosure.
Figure 2:
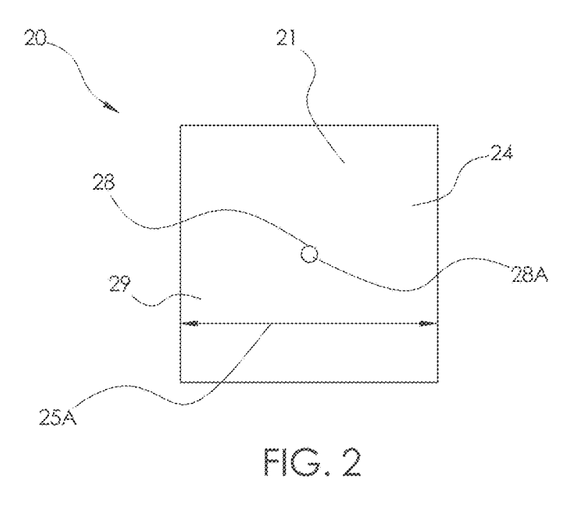
FIG. 2 is a top plan view of the electrical wire/cable guide shown in FIG. 1.
Figure 3:
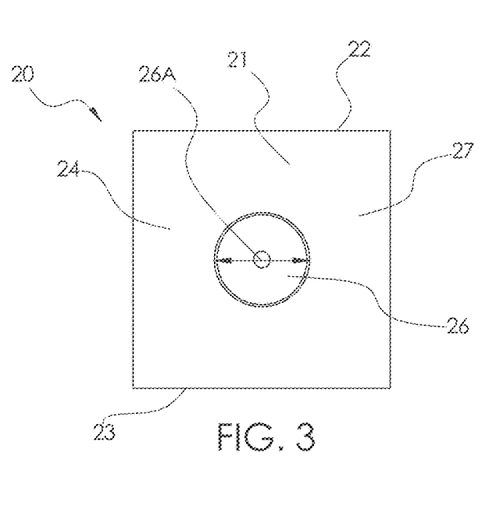
FIG. 3 is a bottom plan view of the electrical wire/cable guide shown in FIG. 1.
Figure 4:
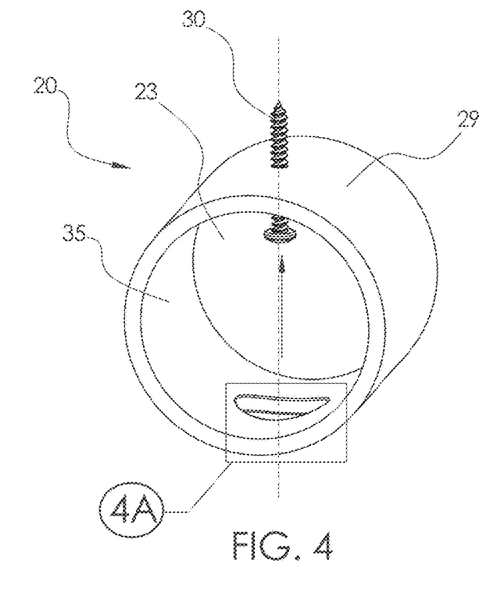
FIG. 4 is a perspective view of the electrical wire/cable guide shown in FIG. 1.
Figure 4A:
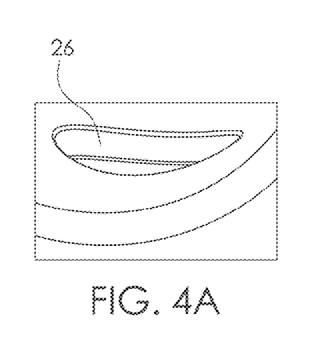
FIG. 4A is an enlarged view of section 4A taken in FIG. 4.
Figure 5:
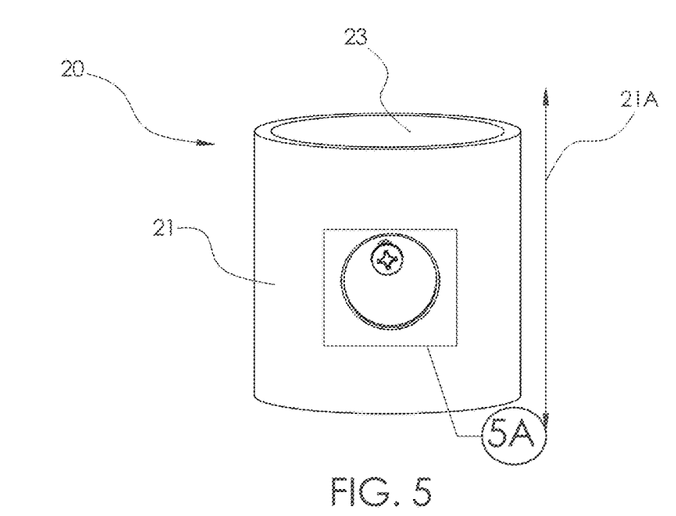
FIG. 5 is another perspective view of the electrical wire/cable guide shown in FIG. 1.
Figure 5A:
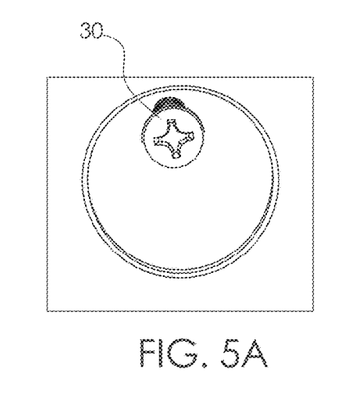
FIG. 5A is an enlarged view of section 5A taken in FIG. 5.
Figure 6:
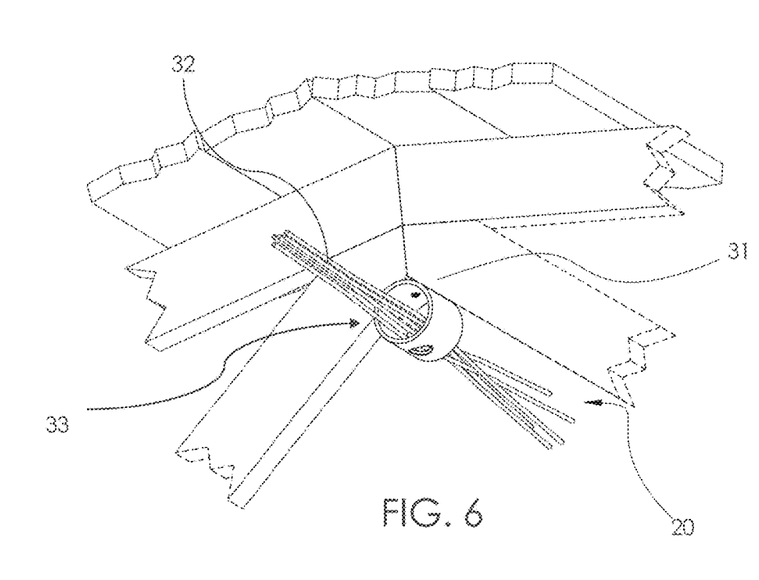
FIG. 6 is an environmental view of the electrical wire/cable guide affixed to a rafter/truss inside space-confined attic, wherein the electrical wires/cables are passed therethrough without touch the rafters, in accordance with a non-limiting exemplary embodiment of the present disclosure.
Figure 7:
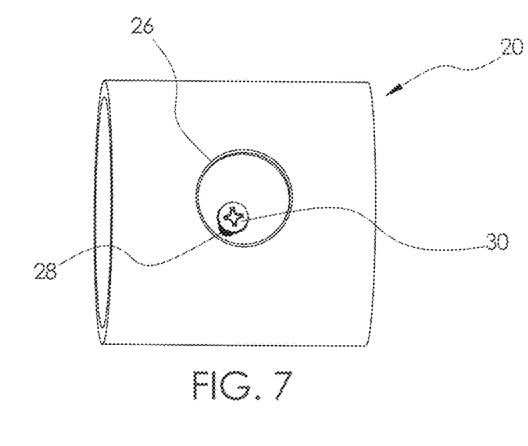
FIG. 7 is an enlarged bottom plan view illustrating how the fastener is passed through the electrical wire/cable guide for being attached in existing support surface, before the electrical wires/cables are passed through the electrical wire/cable guide.
Figure 8:
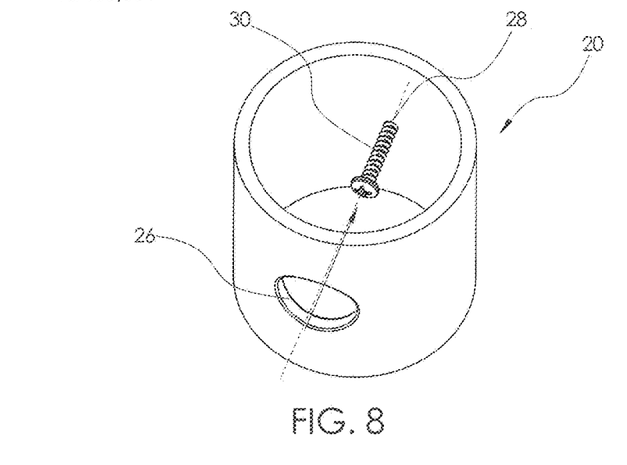
FIG. 8 is a perspective view of the electrical wire/cable guide shown in FIG. 7.
Figure 9:
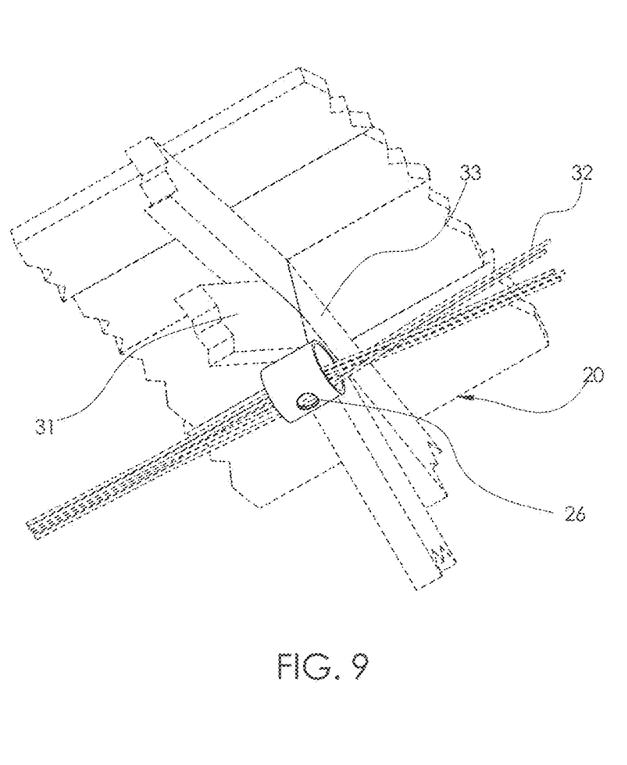
FIG. 9 is another environmental view of the electrical wire/cable guide affixed to a rafter/truss inside space-confined attic, wherein the electrical wires/cables are passed therethrough without touch the rafters, in accordance with a non-limiting exemplary embodiment of the present disclosure.
Figure 10:
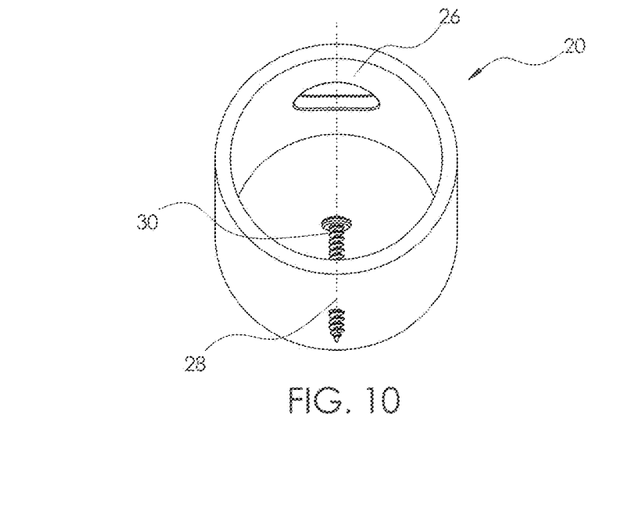
FIG. 10 is another perspective view of the electrical wire/cable guide shown in FIG. 7, illustrating the directional movement of the fastener.

A non-limiting exemplary embodiment(s) of the present disclosure is referred to generally in FIGS. 1-10 and is intended to provide a specially configured electrical wire/cable 32 (line) guide 20 that facilitates easy access to the electrical wire/cable 32 during repairs while preventing damage to its dielectric insulation, which can degrade its electrical signal and cause fires. It should be understood that the exemplary embodiment(s) may be used to guide 20 a variety of electrical wires/cables, and should not be limited to any particular electrical wire/cable 32 described herein.

Referring to FIGS. 1-10 in general, in a non-limiting exemplary embodiment(s), the attic/wall electrical wire guide 20 may be cylindrical in shape have at least one small aperture 28 to accept a screw to fix/attach the guide 20 to a wall/surface, and another aperture 26 which is opposite to the first aperture 26 and bigger in diameter to accept a screwdriver to drive the screw into a wall/surface 31. The electrical line guide 20 facilitates easy access to an electrical line 32 located within a building attic or wall frame. Such an electrical line guide 20 includes a single and unitary body 21 having a predetermined fixed (e.g., cylindrical) shape and including an open proximal end 22 and an open distal end 23 coaxially aligned therewith and opposed therefrom, an outer surface 24 extended from the open proximal end 22 to the open distal end 23, an axial bore 25 linearly extended from the open proximal end 22 to the open distal end 23, a first aperture 26 located at an anterior side 27 of the outer surface 24, and a second aperture 28 located at a posterior side 29 of the outer surface 24. A fastener 30 is removably penetrated entirely through the first aperture 26 and partially through the second aperture 28 and terminating in an existing support surface 31. Advantageously, the axial bore 25 is configured to receive a plurality of electrical lines 32 therethrough while the single and unitary body 21 is supported at an elevated height 33 relative to the existing support surface 31 (e.g., rafter, truss, stud wall, footing, etc.). Advantageously, the electrical lines 32 remain spaced from the existing support surface 31. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, advantageously, a screw driver or other tool is partially passed through second aperture 28 to install the fastener 30 through the first aperture 26 and into the support surface 31. Thus, body 21 becomes affixed to the support surface 31.

In a non-limiting exemplary embodiment, the open proximal end 22 has a first diameter 22a equal to a second diameter 23a of the open distal end 23. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the open proximal end 22 has a circular shape. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the open distal end 23 has a circular shape. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the first aperture 26 has a third diameter 26a greater than a fourth diameter 28a of the second aperture 28. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the first aperture 26 is diametrically opposed from the second aperture 28. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the axial bore 25 has a uniform fifth diameter 25a configured to support the electrical line 32 along an entire longitudinal length 21a of the single and unitary body 21. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the fastener 30 is oriented orthogonal to longitudinal length 21*a* of the single and unitary body 21. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the single and unitary body 21 has a tubular shape. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the axial bore 25 is continuous and uninterrupted along the entire longitudinal length 21*a* of the body 21. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the single and unitary body 21 has an entirely smooth inner surface 35, and the outer surface 24 is entirely smooth. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

In a non-limiting exemplary embodiment, the single and unitary body 21 may include one or more divider walls and smaller conduits extended longitudinally therethrough for receiving, isolating, and segregating wires as needed. Such a structural configuration yields the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

The present disclosure further includes a method of using an electrical line guide 20 to facilitate easy access to an electrical line located within a building attic or wall frame. The method includes the chronological steps of: obtaining an electrical line guide 20 including a single and unitary body 21 having a predetermined fixed cylindrical shape and including an open proximal end 22 and an open distal end 23 coaxially aligned therewith and opposed therefrom, an outer surface 24 extended from the open proximal end 22 to the open distal end 23, an axial bore 25 linearly extended from the open proximal end 22 to the open distal end 23, a first aperture 26 located at an anterior side 27 of the outer surface 24, and a second aperture 28 located at a posterior side 29 of the outer surface 24; obtaining a fastener 30; removably penetrating the fastener 30 entirely through the first aperture 26; partially penetrating the fastener 30 through the second aperture 28; terminating the fastener 30 in an existing support surface 31 such that the single and unitary body 21 is supported at an elevated height 33 relative to the existing support surface 31; obtaining a plurality of electrical lines 32; and passing the electrical lines 32 through the axial bore 25 while maintaining the electrical lines 32 spaced from the existing support surface 31. Advantageously, a screw driver or other tool is partially passed through second aperture 28 to install the fastener 30 through the first aperture 26 and into the support surface 31. Thus, the body 21 becomes affixed to the support surface 31. Such chronological method steps yield the new, useful, and unexpected result of facilitating and simplifying electrical line replacement in hard to reach areas (attics, crawl spaces, walls, etc.) by eliminating the need to timely and difficult step of installing and/or removing the aforementioned nails, staples, and clamps, which can damage the dielectric sheath surrounding the electrical line. The new electrical line is simply attached to the existing line and pulled through the body 21 of the wire guide 20.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. An electrical line guide that facilitates easy access to an electrical line located within a building attic or wall frame, said electrical line guide consisting of:
   a single and unitary body having a predetermined fixed shape and including
      an open proximal end and an open distal end coaxially aligned therewith and opposed therefrom,
      an outer surface extended from said open proximal end to said open distal end,
      an axial bore linearly extended from said open proximal end to said open distal end,
      a first aperture located at an anterior side of said outer surface, and
      a second aperture located at a posterior side of said outer surface; and
   a fastener removably penetrated entirely through said first aperture and partially through said second aperture and terminating in an existing support surface;
   wherein said axial bore is configured to receive a plurality of electrical lines therethrough while said single and unitary body is supported at an elevated height relative to the existing support surface;
   wherein said electrical lines remain spaced from the existing support surface.

2. An electrical line guide that facilitates easy access to an electrical line located within a building attic or wall frame, said electrical line guide comprising:
   a single and unitary body having a predetermined fixed cylindrical shape and including
      only one open proximal end and only one open distal end coaxially aligned therewith and opposed therefrom,
      an outer surface extended from said open proximal end to said open distal end,
      only one axial bore linearly extended from said open proximal end to said open distal end,
      only one first aperture located at an anterior side of said outer surface, and
      only one second aperture located at a posterior side of said outer surface; and
   a fastener removably penetrated entirely through said first aperture and partially through said second aperture and terminating in an existing support surface;
   a plurality of electrical lines passed through said open proximal end and said open distal end and along a travel path substantially parallel to a longitudinal length of said axial bore;
   wherein said axial bore is configured to receive said electrical lines therethrough while said single and unitary body is supported at an elevated height relative to the existing support surface;
   wherein said electrical lines remain spaced from the existing support surface;
   wherein said open proximal end has a first diameter extended between an entire perimeter of said outer surface;
   wherein said open distal end has a second diameter extended between an entire perimeter of said outer surface.

3. The electrical line guide of claim 2, said first diameter is equal to said second diameter.

4. The electrical line guide of claim 3, wherein said open proximal end has a circular shape.

5. The electrical line guide of claim 4, wherein said open distal end has a circular shape.

6. The electrical line guide of claim 5, wherein said first aperture has a third diameter greater than a fourth diameter of said second aperture.

7. The electrical line guide of claim 6, wherein said first aperture is diametrically opposed from said second aperture.

8. The electrical line guide of claim 7, wherein said axial bore has a uniform fifth diameter configured to support the electrical line along an entire longitudinal length of said single and unitary body.

9. The electrical line guide of claim 8, wherein said fastener is oriented orthogonal to a longitudinal length of said single and unitary body.

10. The electrical line guide of claim 9, wherein said single and unitary body further has a tubular shape.

11. The electrical line guide of claim 10, wherein said axial bore is continuous and uninterrupted along an entire longitudinal length of said body.

12. The electrical line guide of claim 11, wherein said single and unitary body has an entirely smooth inner surface, wherein said outer surface is entirely smooth.

13. A method of using an electrical line guide to facilitate easy access to an electrical line located within a building attic or wall frame, said method including the chronological steps of:

obtaining an electrical line guide including a single and unitary body having a predetermined fixed shape and including an open proximal end and an open distal end coaxially aligned therewith and opposed therefrom, an outer surface extended from said open proximal end to said open distal end, an axial bore linearly extended from said open proximal end to said open distal end, a first aperture located at an anterior side of said outer surface, and a second aperture located at a posterior side of said outer surface;

obtaining a fastener;

removably penetrating said fastener entirely through said first aperture;

partially penetrating said fastener through said second aperture;

terminating said fastener in an existing support surface such that said single and unitary body is supported at an elevated height relative to the existing support surface;

obtaining a plurality of electrical lines; and passing said electrical lines through said axial bore while maintaining said electrical lines spaced from the existing support surface.

14. The method of claim 13, wherein said open proximal end has a first diameter equal to a second diameter of said open distal end, wherein said open proximal end has a circular shape, wherein said open distal end has a circular shape.

15. The method of claim 14, wherein said first aperture has a third diameter greater than a fourth diameter of said second aperture, wherein said first aperture is diametrically opposed from said second aperture.

16. The method of claim 15, wherein said axial bore has a uniform fifth diameter configured to support the electrical line along an entire longitudinal length of said single and unitary body.

17. The method of claim 16, wherein said fastener is oriented orthogonal to a longitudinal length of said single and unitary body.

18. The method of claim 17, wherein said single and unitary body further has a tubular shape.

19. The method of claim 18, wherein said axial bore is continuous and uninterrupted along an entire longitudinal length of said body.

20. The method of claim 19, wherein said single and unitary body has an entirely smooth inner surface, wherein said outer surface is entirely smooth.

* * * * *